United States Patent Office 3,008,962
Patented Nov. 14, 1961

3,008,962
BLUE SHADE GRAY VAT DYE AND
PROCESS THEREFOR
Salvatore F. Torre, South Plainfield, N.J., assignor to American Cyanamid Company, New York, N.Y., a corporation of Maine
No Drawing. Filed Aug. 25, 1959, Ser. No. 835,855
1 Claim. (Cl. 260—274)

This invention relates to a process for preparing new vattable compositions capable of dyeing vegetable fibers blue gray shades. More specifically, this invention relates to an improvement in a process for producing gray vattable compositions which comprises retaining substantially all by-products in the intermediate mixture of secondary amines formed by the reaction of chlorinated benzanthrone with amino anthraquinone when said secondary amines are subjected to the final alcoholic caustic fusion.

Many years ago a vat dyestuff was obtained by condensing bz-1-halogeno-benzanthrone with alpha amino anthraquinone and then closing the ring to produce the acridine dyestuff by alkali fusion. The dyestuff had the following formula:

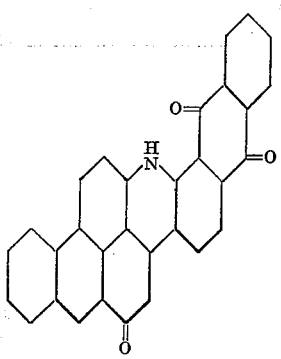

and dyed vegetable fibers olive-green shades. The greater purity of the dyestuff the brighter the shades of olive-green produced by its use. It was therefore always attempted to produce a dyestuff of maximum purity. One of the main grounds of impurity adversely affecting the olive-green shade was the fact that it was difficult to produce pure bz-1-chlorobenzanthrone, and every attempt was made to use as a starting material chlorobenzanthrone of maximum purity.

In U.S. Letters Patent 2,456,589 there is disclosed a process for the preparation of a green-gray vat dye in which the halogenated benzanthrone is not purified. In the process of that patent the crude chloro benzanthrone, which contains both the mono and dichlorinated benzanthrone, is subjected to a condensation with alpha amino anthraquinone to form a resultant mixture of secondary amines. This reaction mixture is then filtered and washed and the product is subjected to alcoholic caustic fusion. The dyestuff obtained is surprisingly a gray though still having a greenish cast as one would normally expect because of the high content of the green dyestuff disclosed above. Although the patentee started with an impure chlorinated benzanthrone the intermediate benzanthronyl amino anthraquinone was subjected to some purification in that the nitro benzene reaction mixture was filtered and washed with nitrobenzene. This filtration and washing removes some of the compounds present in the complex mixture.

I have found that, by the omission of even this purification there is formed a vat dye composition capable of dyeing vegetable fibers a blue shade of gray. It was surprisingly enough the patentee of U.S. 2,456,589 got a gray dyestuff of good properties by using a complex mixture. It is very surprising that by the omission of all attempts to purify and by the inclusion of all materials which form in such a composition I can get a blue shade. Undoubtedly one of the major constituents of the mixture which my invention produces is the olive green vat dye whose formula is given above. It would therefore, be expected that this constituent would continue to give a green cast to the gray dye. However, I have found that this is not so and that the product obtained is a blue gray.

It is an advantage of my invention that one obtains a blue gray dyestuff of excellent fastness to light, perioxide and washing. Although the green-gray color of the prior art was fast, the presence of these additional by-products, which in the intermediate stage are more soluble in nitro benzene, would be expected to influence adversely the stability to the influence of light, peroxide and washing of my blue gray shade. However this they do not do.

The preparation of the dyestuff in my invention is, with one exception, to be discussed below, similar to that discussed in U.S. 2,456,589 and the disclosure of that patent is therefore herein expressly incorporated the reference.

The one exception is that after the mixture of chlorinated benzanthrone has been condensed with alpha amino anthraquinone in the usual way the reaction mixture, instead of being filtered and washed is subjected to steam distillation until the solvent has been subtantially removed. The solvent can alternatively be removed by vacuum distillation of the reaction mixture, with the same results. All of the solid material formed in such a reaction mixture is thus recovered instead of some being removed by filtration and washing. This mixture is then subjected to the alcoholic caustic fusion as described in the incorporated patent. When the reaction mixture of chlorinated benzanthrone and amino anthraquinone is filtered but not washed there is obtained a gray which is less green than that obtained by the patentee but nowhere near as pure a blue gray shade as that obtained by my improvement.

My invention may be illustrated by the following examples in which parts are by weight unless otherwise specified.

Example 1

To 27 g. of chlorinated benzanthrone (prepared as described in the example in U.S.P. No. 2,456,589) in 160 g. of nitrobenzene is added 10 g. of silicious filter aid. The mixture is held at 125–130° C. for 1 hour and then filtered hot, using an additional 90 g. of nitrobenzene for washing purposes. To the filtrate is added an additional 98 g. of nitrobenzene, 19.6 g. of soda ash, 22.2 g. of alpha-aminoanthraquinone, 1.2 g. of copper powder and 1.2 g. of iodine. This mixture is heated at 210° C. for 10 hours and then cooled to 35° C. The reaction mixture is then subjected to steam distillation until substantially all nitrobenzene is removed. The solid material is removed from the slurry by filtration and the cake is washed alkali free with water and dried.

Example 2

A mixture of 61.7 g. of potassium hydroxide flakes and 25.5 g. of methyl alcohol is heated at the reflux temperature and then cooled to 135° C. There is then added gradually at 135–140° C. 30 g. of the product of Example 1. The mixture is heated with stirring at the reflux temperature for 2 hours. The mixture is then drowned in 710 ml. of water and diluted to 1025 ml. The drowned mixture is heated to 50° C. and then aerated until oxidation of the leuco is substantially complete. After further dilution, the solid dye product is removed by filtration, washed alkaline-free and dried.

Example 3

The procedure of Example 1 is repeated except that after the reaction mixture is cooled to 35° C., the product is filtered from the nitrobenzene reaction mixture. It is however not washed with nitrobenzene. Instead the nitrobenzene-wet press cake is freed of nitrobenzene by steam distillation. The product is then isolated as in Example 1 and subjected to the process of Example 2.

Example 4

Cotton is dyed by the following procedure, using (1) the dyes of U.S. 2,456,589, (2) the dye of Example 2 and (3) the dye of Example 3. To 10 ml. of water is added 1.0 g. of dye. The mixture is pasted well and then diluted with 190 ml. of water at 140° F. then 10 ml. of 30° Bé. caustic soda and 3 g. of sodium hydrosulfite is added and the mixture is stirred at 140° F. until reduction is complete. A 20 g. skein is then entered and the mixture is stirred at 140–145° F. for 45 minutes. The skein is then wrung out and oxidized for 5 minutes at 130° F. in a solution of 5 g. of sodium bicarbonate and 2 g. sodium perborate in 400 ml. of water. The skein is then rinsed in water, soaped, and rinsed again, and dried.

The results are as follows:

Dye of U.S. 2,456,589___ Greenish gray shade.
Dye of Example 2_____ Blue gray shade.
Dye of Example 3_____ Less green than dye of U.S. 2,456,589 but greener than Example 2.

I claim:

In preparing a vattable composition by a process in which (a) benzanthrone is chlorinated in sulfuric acid of 85–100% concentration, at a temperature in the range of 10°–50° C., to a chlorine content between 11.5 and 13.5%; (b) so-chlorinated benzanthrone mixture is reacted, in nitrobenzene solution, with approximately one molecular equivalent of alpha-amino-anthraquinone, in the presence of an acid-binder and of a cupriferous catalyst, to produce an insoluble mixture of secondary amines; (c) the mixed solid secondary amines are collected, freed of nitrobenzene, washed in acid, then again collected, washed and dried; and the so-dried solids are (d) subjected to fusion with alcoholic caustic alkali; and (e) the vat dyestuff so obtained is collected and is capable of dyeing cellulosic fibers greenish-gray shades of excellent fastness, the improved method which comprises (1) subjecting the slurry of said mixture of insoluble secondary amines in nitrobenzene obtained in step (b) above, directly to distillation for sufficient time to remove substantially all the nitrobenzene; and (2) subjecting the resultant mixture comprising said solid amines to the alcoholic caustic alkali fusion of step (d) above; and (3) collecting the resulting dyestuff; said dyestuff being characterized by dyeing cellulosic fibers a blue shade of gray.

References Cited in the file of this patent

UNITED STATES PATENTS 2,456,587    Lytle _____ Dec. 14, 1948